United States Patent [19]

Anderson

[11] Patent Number: 5,094,562
[45] Date of Patent: Mar. 10, 1992

[54] THREE-WAY CLAMP FOR STRUCTURAL ASSEMBLIES

[75] Inventor: Roger Anderson, Ridgefield, Conn.
[73] Assignee: Robotic Originals, Inc., Danbury, Conn.
[21] Appl. No.: 609,810
[22] Filed: Nov. 6, 1990
[51] Int. Cl.⁵ .............................................. F16L 41/08
[52] U.S. Cl. .................................. 403/170; 403/174; 403/175; 403/218; 403/290
[58] Field of Search ............... 403/170, 174, 175, 178, 403/217–219, 231, 236, 290, 344, 391, 396; 52/280, 281, 584, 646, 648

[56] References Cited

U.S. PATENT DOCUMENTS

| | | | |
|---|---|---|---|
| 2,683,329 | 7/1954 | Kobler | 403/174 X |
| 2,836,449 | 5/1958 | Varlonga | 403/391 |
| 3,860,351 | 1/1975 | Weiss et al. | 403/218 |
| 4,115,021 | 9/1978 | Loch | 403/362 X |
| 4,294,561 | 10/1981 | Chapman et al. | 403/219 |
| 4,619,545 | 10/1986 | Kuttenbaum | 403/290 X |
| 4,772,153 | 9/1988 | Huang | 403/290 X |
| 4,864,795 | 9/1989 | Burg | 403/174 X |

FOREIGN PATENT DOCUMENTS

| | | |
|---|---|---|
| 23308 | 11/1924 | France . |
| 600163 | 11/1959 | Italy ........................... 403/175 |
| 13731 | of 1914 | United Kingdom . |
| 496969 | 12/1938 | United Kingdom . |
| 837496 | 6/1960 | United Kingdom ........... 403/175 |

OTHER PUBLICATIONS

"Louden Dairy Barn Fittings", The Louden Machinery Co., Jun. 25, 1915.

Primary Examiner—Randolph A. Reese
Assistant Examiner—Heather Chun
Attorney, Agent, or Firm—Schweitzer Cornman & Gross

[57] ABSTRACT

A three-way clamp for the assembly of structural frameworks is disclosed. The clamp includes a block-like clamp body provided with a first bore extending through the block and second and third bores intersecting with the first at right angles and intersecting with each other at right angles. The clamp body is slotted in the plane of the axis of the second and third bores, to form cantilever extension portions of the block body capable of being squeezed together by a single compression bolt. Strut-like tubular structural elements are received in the several bores, one passing through the block, the other two being inserted endwise into the second and third bores. By tightening the single compression bolt, the clamp body is caused to be tightened down into secure gripping relation with structural elements in each of three right-angularly related, intersecting axes, significantly expediting assembly, disassembly and adjustment of frame structures.

8 Claims, 1 Drawing Sheet

5,094,562

THREE-WAY CLAMP FOR STRUCTURAL ASSEMBLIES

BACKGROUND AND SUMMARY OF THE INVENTION

The invention is directed to structural frameworks and the like, comprised of elongated, strut-like structural elements rigidly joined at points of intersection to form a rigid three-dimensional structure. Such structural frameworks are used to advantage wherever lightweight, rigid frame structures are utilized. Among other uses of such structural frameworks is in the manufacture of customized or prototype machinery, for example.

It is known to construct structural frameworks utilizing a plurality of strut-like structural elements joined together by clamps or other connecting means to form a rigid, three-dimensional structure, which may be of a permanent or temporary character. In accordance with the present invention, a novel three-way clamp element is provided, for use in the construction of such structural framework assemblies. The clamp is provided with a through bore and two intersecting shouldered bores, each arranged to receive, with a relatively minimum clearance, a separate strut-like element. The two shouldered bores are disposed at an angle to each other of less than 180° (typically 90°) and their axes define a plane intersecting with the axis of the through bore. The body of the clamping member is formed with a slot, which lies in or near the plane defined by the shouldered bores. The slot intersects with the shouldered bores, along their full length, and also intersects with the through bore. The arrangement is such that the body of the clamp is formed with a pair of opposed, cantilever extension portions, the free ends of which are spaced apart by the width of the slot. When structural elements are received in each of the bores, all of the structural elements can be simultaneously clamped and secured by applying a compressive force to the opposed cantilever extension portions of the clamping body. Typically and advantageously, the compression force may be applied by a single bolt which extends through one of the portions and is threadedly engaged with the other and can be tightened quickly after positioning of the structural elements in the clamp body.

The clamping device of the invention greatly expedites the assembly of structural frameworks and is particularly useful for customized or prototype structures because of the facility with which structural elements may be assembled, clamped, and if necessary, released for adjustment.

For a more complete understanding of the above and other features and advantages of the invention, reference should be made to the following detailed description of a preferred embodiment and to the accompanying drawing.

DESCRIPTION OF PREFERRED EMBODIMENT

Figure 1:
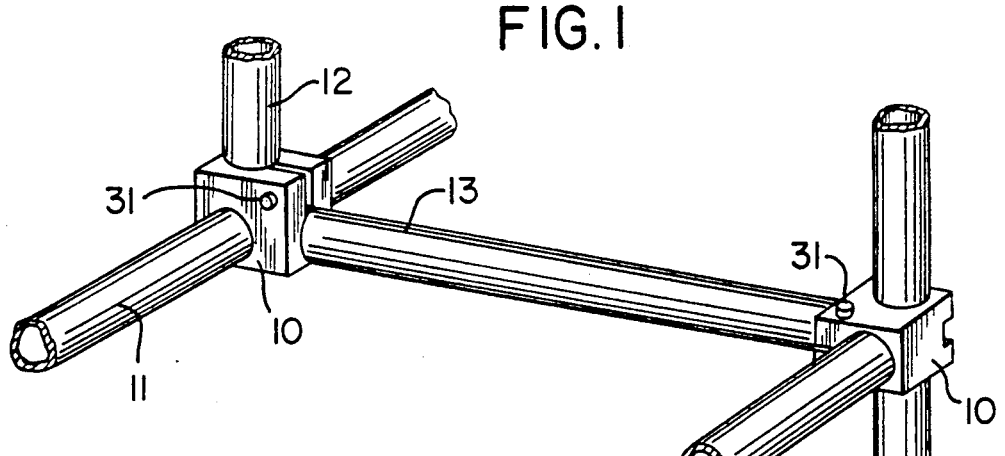
FIG. 1 is a fragmentary perspective view of a structural assembly utilizing the novel three-way clamping device of the invention.

Referring now to the drawing, the reference numeral 10 designates generally a block-like clamp body, which is arranged to be joined with elongated strut-like structural elements, for example elements 11–13 in FIG. 1. The clamp body 10 may be of molded or machined construction and advantageously is of a generally rectangular configuration. Typically, it is formed of a material, such as aluminum, although for some purposes structural plastic materials could be appropriately used.

Pursuant to the invention, the clamp body includes a through bore 14, which extends entirely through the clamp body, from one side to the other thereof and is arranged to slidably receive one of the structural elements, such as the tubular element 11. The diameter of the bore 14 is such, in relation to the outside diameter of the structural element 11, as to receive the element with a minimum clearance, while at the same time providing for a sliding fit of the structural element to accommodate adjustable positioning of the structural element within the clamp body.

Figure 3:
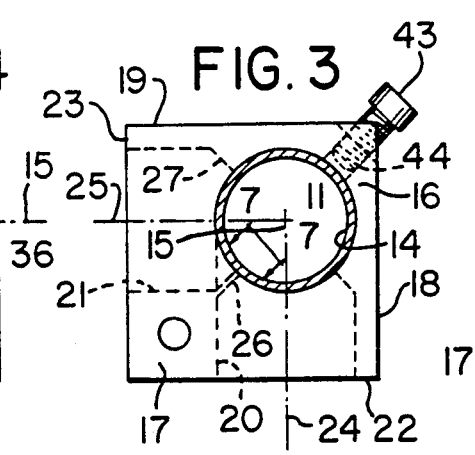
Figure 5:
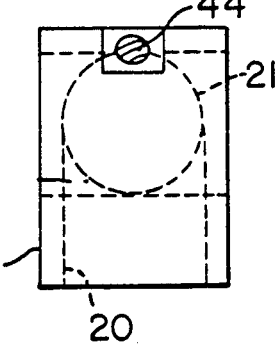
Figure 6:
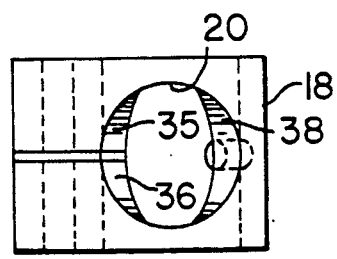

In the illustrated form of the invention, the configuration of the blocking block, in a plane disposed at right angles to the axis of the through bore 14, is preferably more or less square, although such configuration is by no means required. The axis 15 of the through bore is offset from the center of the square configuration, toward one of the corners 16 of the clamp body. Desirably, the axis 15 will lie along a diagonal plane containing the opposite corners 16, 17 of the clamp body. By way of example only, in a typical clamp body of approximate 3 ¼ inch by 3 ¼ inch dimensions, the axis of the through bore 14 may advantageously be offset toward the respective sidewalls 18, 19 (FIG. 3) so as to be spaced approximately 1 ¼ inches from said sidewalls.

Figure 2:
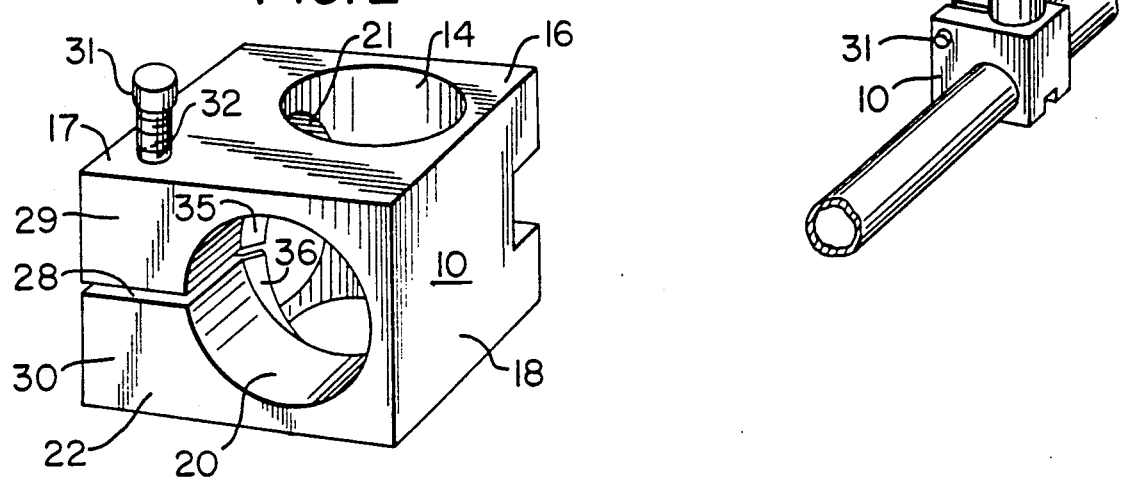
FIG. 2 is a perspective view of the clamp.
Figure 4:
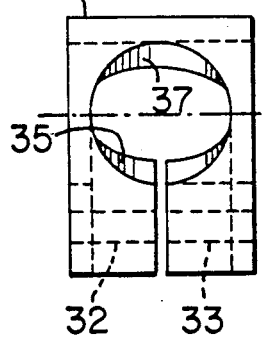
FIGS. 3-6 are various orthographic views of the clamping element of FIG. 2.

The clamp body illustrated in FIG. 2 includes two additional bores 20, 21, entering from the respective sidewalls 22, 23. The respective axes 24, 25 of the bores 20, 21 advantageously intersect with each other and with the axis 15 of the through bore 14. The axes 24, 25 define an angle of less than 180°, and typically and advantageously an angle of 90°. The axes 24, 25 define a plane which typically intersects with the axis 15 at an angle of 90°.

The bores 20, 21 advantageously are of limited depth, partially intersecting with the through bore 14 but forming shoulders 26, 27 at their inner ends for limiting the insertion of structural elements, such as elements 12, 13 of FIG. 1. As in the case of the through bore 14, the diameter of the shouldered bores 20, 21 is such as to slidably receive the structural elements with a minimum of clearance, while accommodating a sliding fit.

In accordance with the invention, the clamp body 10 is formed with a slot 28 which is disposed in or closely adjacent to the plane defined by the axes 24, 25. The slot 28 extends through the entire corner section 17 of the block, intersecting with the shouldered bores 20, 21 along the full length of their respective sidewalls, and also intersecting transversely with the through bore 14. The arrangement is such as to form in the clamp body a pair of opposed, cantilever extension portions 29, 30. Associated with the cantilever extension portions is a means for applying compression thereto in the direction of the slot 28. Advantageously, the means to apply compression is a bolt 31, which is received in an opening 32 in one of the cantilever extension portions 29, and is threadedly engaged in a bore 33 in the opposite portion 30.

Pursuant to the invention, the width of the slot 28 is substantially greater than the normal clearance between the openings 14, 20, 21, and the respective structural elements received therein. For example, in an advantageous embodiment of the invention, designed to receive structural elements of approximate two inch outside diameter, a slot width of ⅛ inch is appropriate, in conjunction with a nominal clearance between the bores and their respective structural elements of a few one thousands of an inch.

When a partial structural assembly is made, by inserting a first structural element 11 into the through bore 14, and second and third structural elements 12, 13 into the shouldered bores 20, 21, there is desirably an initial snug fit between the various parts, while allowing for limited relative movement as appropriate for adjustment of the initial positioning. As is evident particularly in FIG. 2, the cantilever extension portions are supported entirely by portions of the body 10 extending along the walls 18, 19, and by the corner portion 16. Accordingly, when the bolt 31 is tightened, the walls of the respective bores 20, 21 are correspondingly reduced in circumference, tightly and rigidly securing the structural elements 12, 13 secured therein.

Figure 7:
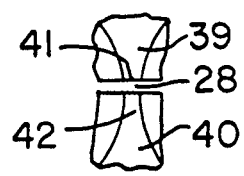
FIG. 7 is an enlarged, fragmentary view as taken generally on line 7—7 of FIG. 3.

In addition to the circumferential gripping action on the structural elements 12, 13, the clamping body 10 also exerts, when the cantilever extension portions are compressed, a strong gripping action on the structural element 11 passing through the bore 14. In this respect, as the cantilever extension portions 29, 30 are compressed, they tend to bend in a way to press the shoulder portions 35, 36 in a generally radially inward direction with respect to the axis 15 of the through bore 14. This clamping action differs from that affecting the shouldered bores 20, 21, where there is a circumferential tightening around the structural elements. In connection with the through bore 14, portions of the wall of the bore, specifically those formed by the shoulder portions 35, 36 of the bores 20, 21, are displaced radially inward by an action which, in effect, is a tilting action with respect to the central axis 15 of the through bore 14. Advantageously, the machining of the shouldered bores 20, 21 is limited to a depth at which at least limited wall surface areas 39, 40 of the through bore 14 (see FIG. 7) remain intact and in contact with the outer wall of a structural element 11 received in the bore. The end edge extremities 41, 42 of the respective wall portions 39, 40 press radially inward against the wall of the structural element and tend to dig into the surface to assist in the gripping action.

Optionally, it may be desired to provide for a positioning bolt 43, which is received in a diagonal bore 44 provided in the corner 16 of the clamp body 10. It is sometimes advantageous, during preliminary assembly operations, to tighten the positioning bolt 43 lightly against the outer surface of a structural member 11 extending through the through bore 14, to assist in retaining the clamp body 10 in a desired orientation and/or desired position along the structural element 11. In general, the positioning bolt is not relied upon for primary clamping effect, but only for temporary holding of the clamp during assembly. It may be left in place or removed after tightening of the compression bolt 31, as may be desired. The clamping device of the invention provides for highly expeditious and efficient assembly of structural frameworks utilizing strut-like structural elements connected together at various joints to form a rigid structure. Such structures are particularly desirable for lightweight frames, prototype assemblies and the like. With the device of the invention, tightening or loosening of a single compression bolt 31 enables a frame joint to be assembled or disassembled, adjusted, etc., the resulting frame structure is nevertheless extremely rigid and sturdy.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

I claim:

1. A three-way clamp for the assembly of structural frameworks formed of one or a plurality of such clamps and a plurality of elongated strut-like structural elements, said clamp comprising,
   (a) a unitary block-like clamp body formed substantially rigid structural material,
   (b) said body having a first bore extending therethrough from one side of said block to the other side of said block and adapted to slidably receive, with minimum clearance, a first one of said strut-like structural elements,
   (c) said body having second and third bores, each intersecting with said first bore at right angles and each adapted to slidably receive, with minimum clearance, end extremity portions of respective second and third strut-like structural members,
   (d) said second and third bores being disposed with their axes substantially in a common plane and with their axes oriented at a predetermined included angle less then 180°,
   (e) said body being formed with a partial slot, closed at one side, located in or closely adjacent to the common plane of the axes of said second and third bores, and in the portion of said body within said included angle,
   (f) said slot being of a continuous configuration extending longitudinally along the full length of each of said second and third bores and opening into but not passing through said first bore, whereby the portions of said clamp body within said included angle form cantilever extension portions separated from each other by the thickness of said slot,
   (g) portions of said body member on the opposite side of said first bore from said cantilever extension portions being integrally joined,
   (h) the thickness of said slot being greater than the clearances between said bores and the strut-like structural elements received therein, and
   (i) means for compressing said cantilever extension portions to close said slot and thereby simultaneously clampingly secure each of said strut-like structural elements rigidly in said clamp body.

2. A three-way clamp according to claim 1, further characterized by,
   (a) said means for compressing comprising a bolt extending through one of said cantilever extension portions and threadedly engaged with the other.

3. A three-way clamp according to claim 1, further characterized by,
   (a) said body member having a threaded bore therein intersecting with said first bore, and (b) a positioning bolt received in said threaded bore for temporarily positioning said block with respect to a structural member received in said first bore during assembly of additional structural members with said body member.

4. A three-way clamp according to claim 1, further characterized by, (a) said second and third bores being oriented at right angles to each other.

5. A three-way clamp according to claim 4, further characterized by, said first, second and third bores being arranged with their respective axes intersecting.

6. A three-way clamp for the assembly of structural frameworks formed of one or a plurality of such clamps and a plurality of elongated strut-like structural elements, said clamp comprising, (a) a block-like clamp body formed of substantially rigid structural material, (b) said body having a first bore extending therethrough from one side of said block to the other side of said block and adapted to slidably receive, with minimum clearance, a first one of said strut-like structural elements, (c) said body having second and third bores, each intersecting with said first bore at right angles and each adapted to slidably receive, with minimum clearance, and extremity portions of respective second and third strut-like structural members, (d) said second and third bores being disposed with their axes substantially in a common plane and with their axes oriented at a predetermined included angle less than 180°, (e) said body being formed with a slot, located in or closely adjacent to the common plane of the axes of said second and third bores, and in the portion of said body within said included angle, (f) said slot being of a continuous configuration extending longitudinally along the full length of each of said second and third bores and opening into said first bore, whereby the portions of said clamp body within said included angle form cantilever extension portions separated from each other by the thickness of said slot, (g) the thickness of said slot being greater than the clearances between said bores and the strut-like structural elements received therein, and (h) means for compressing said cantilever extension portions to close said slot and thereby simultaneously clampingly secure each of said strut-like structural elements rigidly in said clamp body, (i) said clamp body being of generally rectangular configuration, (j) said first bore being offset from the center of said rectangular configuration toward one corner portion thereof, (k) said second and third bores being offset from the center of said rectangular configuration in a direction toward the offset of said first bore, and (l) said means for compressing comprising a compressing element connecting one of said cantilever extension portions to the other of said cantilever portions in a corner region of said body diagonally opposite to the corner toward which said first bore is offset.

7. A three-way clamp for the assembly of structural frameworks formed of one or a plurality of such clamps and a plurality of elongated strut-like structural elements, said clamp comprising, (a) a block-like clamp body formed of substantially rigid structural material, (b) said body having a first bore extending therethrough from one side of said block to the other side of said block and adapted to slidably receive, with minimum clearance, a first one of said strut-like structural elements, (c) said body having second and third bores, each intersecting with said first bore at right angles and each adapted to slidably receive, with minimum clearance, end extremity portions of respective second and third strut-like structural members, (d) said second and third bores being disposed with their axes substantially in a common plane and with their axes oriented at a predetermined included angle less then 180°, (e) said body being formed with a slot, located in or closely adjacent to the common plane of the axes of said second and third bores, and in the portion of said body within said included angle, (f) said slot being of a continuous configuration extending longitudinally along the full length of each of said second and third bores and opening into said first bore, whereby the portions of said clamp body within said included angle form cantilever extension portions separated from each other by the thickness of said slot, (g) the thickness of said slot being greater than the clearances between said bores and the strut-like structural elements received therein, and (h) means for compressing said cantilever extension portions to close said slot and thereby simultaneously clampingly secure each of said strut-like structural elements rigidly in said clamp body, (i) said second and third bores being of limited depth whereby said second and third bores have partial bottom walls forming shoulder portions in said clamp body, (j) said shoulder portions being formed in part by side wall portions of said first bore located between said first and second bores, (k) said side wall portions bearing radially inward with respect to the longitudinal axis of said first bore when said cantilever extension portions are compressed.

8. A three-way clamp according to claim 7, further characterized by (a) said side wall portions extending longitudinally to said slot, from each side thereof.

* * * * *